United States Patent [19]

Reuben

[11] Patent Number: 5,039,447

[45] **Date of Patent: * Aug. 13, 1991**

[54] POURABLE SULFONE PERACID COMPOSITIONS

[75] Inventor: Bertie J. Reuben, St. Louis, Mo.

[73] Assignee: Monsanto Company, St. Louis, Mo.

[*] Notice: The portion of the term of this patent subsequent to Apr. 2, 2008 has been disclaimed.

[21] Appl. No.: 282,715

[22] Filed: Dec. 12, 1988

[51] Int. Cl.[5] ........................ C01B 15/06; C11D 3/395

[52] U.S. Cl. ........................ 252/186.26; 252/186.42; 252/99; 252/95

[58] Field of Search ........................ 252/186.23, 186.42, 252/186.26, 99, 98, 530

[56] References Cited

U.S. PATENT DOCUMENTS

| | | | |
|---|---|---|---|
| 3,847,830 | 11/1974 | Williams et al. | 252/186 |
| 4,115,059 | 9/1978 | Blumbergs et al. | 252/186.42 |
| 4,448,705 | 5/1984 | Gray | 252/186.42 |
| 4,681,592 | 7/1987 | Hardy et al. | 8/111 |
| 4,758,369 | 7/1988 | Dyroff et al. | 252/94 |
| 4,822,510 | 4/1989 | Madison et al. | 252/186.42 |
| 4,824,591 | 4/1989 | Dyroff et al. | 252/186.42 |
| 4,828,747 | 5/1989 | Rerek et al. | 252/186.42 |

FOREIGN PATENT DOCUMENTS

| | | |
|---|---|---|
| 1041417 | 9/1966 | United Kingdom . |
| 1577396 | 10/1980 | United Kingdom . |

OTHER PUBLICATIONS

Folli et al. J. Chem. Soc. 1986 pp. 1317–1322—Assymetric Induction and Configurational Correlation in Oxidations at Sulphur.

Barbieri et al. La Ricerca Scientifica 33—A General Method For the Synthesis of Organic Peracide.

Barbieri et al. Bolletino 23, pp. 47–52 1965–Asymmetric Synthesis and Absolute Configuratons of Sulfoxides.

*Primary Examiner*—Robert L. Stoll

*Assistant Examiner*—Joseph D. Anthony

*Attorney, Agent, or Firm*—Raymond C. Loyer; Richard H. Shear; James C. Bolding

[57] ABSTRACT

The invention relates to aqueous stable liquid bleaching compositions comprising a sulfone peroxycarboxylic acid, an anionic surfactant, a non-ionic surfactant and optionally a salt stabilizer.

10 Claims, No Drawings

POURABLE SULFONE PERACID COMPOSITIONS

BACKGROUND OF THE INVENTION

The present invention relates to pourable sulfone percarboxylic acid bleach detergent compositions which are chemically stable.

The ability of certain materials to bleach is widely used to remove discolorations or stains from fabrics. Although the exact mechanism by which bleaching agents function is only partially understood, it is generally known that many stains and soils possess a series of alternating single and double bonds and that loss of color can occur if one of the double bonds is destroyed. Thus, a material which can eliminate a double bond may be an effective bleach.

Categories of bleaches which are well known in the art include chlorine releasing compounds, inorganic oxygen bleaches and organic oxygen bleaches. Chlorine releasing compounds have certain disadvantages associated with their use such as, for example, their tendency to weaken or degrade fabrics, a tendency to react with other components of compositions in which they are present and their tendency to fade the colors of many dyed fabrics. Also, some bleaching conditions cause yellowing of certain synthetic or resin treated fabrics.

While inorganic oxygen bleaches overcome many of the disadvantages found with active chlorine releasing compounds, they have the disadvantage that they must be used at relatively high temperatures such as 85° C. or higher. This drawback becomes significant in light of the modern trend of using lower wash temperatures which are generally less than about 60° C. in order to reduce energy cost and prolong the life of the fabric. As a result, it is generally necessary to improve the low temperature performances of inorganic oxygen bleaches through the addition of agents known as bleach activators. Unfortunately, this approach typically requires the use of either a large excess of the inorganic oxygen bleach or the use of a bleach activator in order to obtain an acceptably complete and rapid release of the active bleach species. Still another disadvantage is that the bleach activator must contain within its structure moieties which, upon release of the effective bleaching species, become side products contributing little or nothing to the bleach activity. Thus, the inclusion of these moieties tends to be wasteful.

The disadvantages of chlorine bleaches and inorganic oxygen bleaches, whether used alone in or combination with activators, can be overcome by the use of effective organic oxygen bleaches, especially the peroxycarboxylic acids. Unfortunately, when dissolved in water, percarboxylic acid bleaches are unstable, losing their active oxygen and converting to carboxylic acid. Thus, it is not possible to make a stable aqueous bleach solution with most percarboxylic acids. However, a pourable bleach can be made with percarboxylic acids of low water solubility by dispersing the peracid in water wi&:h stabilizing agents to maintain the percarboxylic in suspension or slurry. The presence of water in these bleach compositions accelerates their decomposition on storage such that it is difficult to obtain acceptable shelf life. Thus, there is a continuing need for chemically stable aqueous slurry peroxycarboxylic acids for use in effective bleaching of fabrics.

SUMMARY OF THE INVENTION

The present invention provides an aqueous liquid slurry composition comprising a) a sulfone peroxycarboxylic acid having the formula,

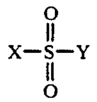

wherein A and B are peroxycarboxylic acid compatible organic moieties bonded to the sulfur atom by a carbon atom, at least one of A and B containing at least one

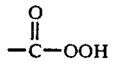

group bonded to a carbon atom, b) an anionic surfactant, c) a non-ionic surfactant, and optionally d) a salt stabilizer.

DETAILED DESCRIPTION OF THE INVENTION

Preferably, organic moieties A and B of the above formula are selected from the group consisting of cyclic, linear or branched alkyl groups containing from about 1 to about 16 carbon atoms (more preferably from about 2 to 10 carbon atoms), aryl groups, aromatic heterocyclic groups, polyaryl groups consisting of from 2 to about 4 annelated benzenoid rings, and combinations thereof. Also, organic moieties A and B can be substituted with essentially any peroxycarboxylic acid compatible group or groups selected from hydroxy, halogen (chloro, bromo, or fluoro), sulfonate, nitro, carboxylic acid, carboxylate salt or ester, phenyl, $C_{1-5}$ alkoxy (e.g. ethoxy), heteroaryl, sulfone, amine oxide, amide, ester, nitrile and sulfate groups and the like to replace a hydrogen atom attached to the organic moieties A or B. The organic moieties A and B may not contain substituents which would react readily with the active oxygen from the peroxyacid group. Common reactive groups may include iodides, ketones, aldehydes, sulfoxides, sulfides, mercaptans, amines, reactive olefins, etc.

Specific examples of sulfone peroxycarboxylic acids which can be used in the composition of the invention are 4,4'-sulfonyldiperoxybenzoic acid (SPB), 3-(cyclohexylsulfonyl) peroxypropionic acid, 3,3'-sulfonyldiperoxypropionic acid, 4-(methylsulfonyl) peroxybenzoic acid, 11-(methylsulfonyl) peroxyundecanoic acid, 2,2-sulfonyldiperoxyacetic acid, 3-(n-decylsulfonyl) peroxypropionic acid, 3-(n-octylsulfonyl) peroxypiopionic acid, and 3-(n-octylsulfonyl) peroxybutyric acid.

Included among the organic moieties A and B of the above formula are alkyl, aralkyl inclusive of cyclic, straight and branched chain radicals, such as methyl, ethyl, propyl, isopropyl, cyclopropyl, cyclohexyl, tertiary butyl, n-butyl and the various forms of amyl, hexyl, heptyl, octyl, nonyl, decyl, undecyl, dodecyl, tridecyl, tetradecyl, pentadecyl, hexadecyl, heptadecyl, octadecyl, benzyl, phenylethyl, naphthylethyl, tolylethyl, methylbenzyl, phenylbenzyl and the like, aryl groups and alkaryl groups such as phenyl, biphenyl, tolyl, xylyl, naphthyl, and the like. It is preferred that such A and B groups contain from 1 to 18 carbon atoms. More preferably A is a hydrocarbyl group containing from 6 to 12 carbon atoms and containing no peracid group while B is a hydrocarbyl group containing from two to seven carbon atoms substituted with one peracid group. The preferred hydrocarbyl group is an alkyl group having, when present, a peracid at the terminal carbon atom. However, the peracid group can be located on other carbon atoms of the alkyl chain. Typical examples of compounds and groups of compounds within the above formula are:

| A | B |
|---|---|
| $C_{6-12}$ alkyl | $C_{1-6}$ alkyl $(CO_3H)_n$ |
| $C_{6-12}$ alkyl | $C_{3-6}$ alkyl $(CO_3H)_n$ |
| $C_{6-12}$ alkyl | $C_{3-18}$ alkyl $(CO_3H)_n$ |
| $C_{6-12}$ alkyl | peroxypropionic |
| $C_{6-12}$ alkyl | peroxybutyric |
| $C_{6-12}$ alkyl | peroxyhexanoic |
| $C_{6-12}$ alkyl | 3-peroxypropionic |
| $C_{6-12}$ alkyl | 4-peroxybutyric |
| n-decyl | 3-peroxypropionic |
| n-octyl | 3-peroxypropionic |
| n-hexyl | 3-peroxypropionic |
| n-butyl | 3-peroxypropionic |
| n-octyl | 4-peroxybutyric |
| n-decyl | 4-peroxybutyric |
| n-nonyl | 3-peroxypropionic |
| n-heptyl | 3-peroxypropionic |
| n-nonyl | 4-peroxybutyric |

For further discussion of sulfone peroxycarboxylic acids useful in the composition of the invention see compounds disclosed in U.S. Pat. No. 4,758,369 issued July 19, 1988.

It is particularly surprising that members of this class of sulfone compounds exhibit a combination of a high level of activity for bleaching or stain removal, a high degree of storage stability, and a very low level of damage to dyes in colored articles subjected to bleaching. Additional advantages of many sulfone peroxycarboxylic acids include unusually efficient means for their preparation, the ability to use low cost raw materials for their production, and physical properties which enable them to be efficiently incorporated into various formulated products.

Surfactants useful in the compositions of the invention can be selected from the group consisting of organic anionic and non-ionic surfactants and mixtures thereof. These surfactants are well known in the art.

Water-soluble salts of the higher fatty acids, that is, "soaps", are useful as the anionic surfactant in the compositions of the invention. This class of surfactants includes ordinary alkali metal soaps such as sodium, potassium, ammonium and alkanolammonium salts of higher fatty acids containing from about 8 to about 24 carbon atoms and preferably from about 10 to about 20 carbon atoms.

Another class of anionic surfactants includes water-soluble salts, particularly the alkali metal, ammonium and alkanolammonium salts, of organic sulfuric reaction products having in their molecular structure an alkyl group containing from about 8 to about 22 carbon atoms and a sulfonic acid or sulfuric acid ester group. Included in the term "alkyl" is the alkyl portion of acyl groups. Examples of this group of synthetic surfactants which can be used in the present detergent compositions are the sodium and potassium alkyl sulfates, especially those obtained by sulfating the higher alcohols, for example, those having $C_8$–$C_{18}$ carbon atoms, produced by reducing the glycerides of tallow or coconut oil; and sodium and potassium alkyl benzene sulfonates, in which the alkyl contains from about 9 to about 15 carbon atoms in the straight chain or branched chain configuration, for example, those of the type described in U.S. Pat. Nos. 2,220,099 and 2,477,383, incorporated herein by reference.

Other anionic surfactant compounds useful herein include the sodium alkyl glyceryl ether sulfonates, such as those ethers and higher alcohols derived from tallow and coconut oil; sodium coconut oil fatty acid monoglyceride sulfonates and sulfates; and sodium or potassium salts of alkyl phenol ethylene oxide ether sulfate containing from about 1 to about 10 units of ethylene oxide per molecule and wherein the alkyl groups contain from about 8 to about 12 carbon atoms.

Still other useful anionic surfactants herein include the water-soluble salts of esters of alpha-sulfonated fatty acids containing from about 6 to about 20 carbon atoms in the ester group; water-soluble salts of 2-acyloxyalkane-1-sulfonic acids containing from about 2 to about 9 carbon atoms in the acyl group and from about 9 to about 23 carbon atoms in the alkane moiety; alkyl ether sulfates containing from about 10 to about 20 carbon atoms in the alkyl group and from about 1 to about 30 moles of ethylene oxide; water-soluble salts of olefin sulfonates containing from about 12 to about 24 carbon atoms; and beta-alkyloxy-alkane sulfonates containing from about 1 to about 3 carbon atoms in the alkyl group and from about 8 to about 20 carbon atoms in the alkane moiety.

Preferred water-soluble anionic organic surfactants herein include linear alkyl benzene sulfonates containing from about 11 to about 14 carbon atoms in the alkyl group; the tallow range alkyl sulfates; the coconut range alkyl glyceryl sulfonates; and alkyl ether sulfates wherein the alkyl moiety contains from about 14 to about 18 carbon atoms and wherein the average degree of ethoxylation varies between 1 and 6.

Specific preferred anionic surfactants for use herein include: sodium liner $C_{10}$–$C_{12}$ alkyl benzene sulfonate; triethanolamine $C_{10}$–$C_{12}$ alkyl benzene sulfonate; sodium tallow alkyl sulfate; sodium coconut alkyl glyceryl ether sulfonate; and the sodium salt of a sulfated condensation product of tallow alcohol with from about 3 to about 10 miles of ethylene oxide. It is to be recognized that any of the foregoing anionic surfactants can be used separately herein or as mixtures.

Nonionic surfactants include the water soluble ethoxylates of $C_{10}$–$C_{20}$ aliphatic alcohols and $C_6$–$C_{12}$ alkyl phenols. Many non-ionic surfactants are especially suitable for use as suds controlling agents in combination with anionic surfactants of the types disclosed herein.

The non-ionics comprise ethylene oxide and/or propylene oxide condensation products with alcohols, alkylphenol, fatty acids, fatty acid amides. These products generally can contain from 5 to 30 ethylene oxide and/or propylene oxide groups. Fatty acid mono- and dialkylolamides, as well as tertiary amine oxides are also included in the terminology of nonionic detergent active materials.

Specific examples of nonionic detergents include nonyl phenol polyoxyethylene ether, tridecyl alcohol polyoxyethylene ether, dodecyl mercaptan polyoxyethylene thioether, the lauric ester of polyethylene glycol, $C_{12}$–$C_{15}$ primary alcohol/7 ethylene oxides, the lauric ester of sorbitan polyoxyethylene ether, tertiary alkyl amine oxide and mixtures thereof.

Optionally, a salt stabilizer can also be used in enhancing the shelf-life of the compositions of the invention. While the exact mechanism is not known, it is believed that the presence of the salt stabilizer helps maintain the insolubility of the sulfone peroxycarboxylic acid in a useful slurry form to thereby improve stability and should be distinguished from thermal stability. Representative salt stabilizers include sodium sulfate, potassium sulfate, hydrates of salts such as magnesium sulfate, calcium sodium sulfate, magnesium nitrate, potassium aluminum sulfate, aluminum sulfate and the like.

Generally, the compositions of the invention will contain at least about 2% but usually no more than about 20% sulfone peroxycarboxylic acid. The percentages of the other components of the composition will vary according to the concentration of sulfone peroxycarboxylic acid in order to maintain a stable dispersion of the peroxy acid. The determination of such percentages are routine to one of ordinary skill in the art.

Preferably the compositions of the invention contain about 1% to about 25% by weight sulfone peroxycarboxylic acid, from about 1 to about 20% by weight anionic surfactant, from about 1 to about 20% by weight non-ionic surfactant and from about 0% to about 10% by weight salt stabilizer. Most preferably the composition of the invention contains from about 5% to about 10% by weight sulfone peroxycarboxylic acid, from about 5% to about 10% by weight anionic surfactant, from about 2 to about 8% by weight non-ionic surfactant and from about 0 to about 8% by weight salt stabilizer.

The compositions of the invention can also include other materials to produce formulated products. Examples of such formulated products include but are not limited to complete laundry detergents, bleach formulations, machine dishwashing formulations, bleaching formulations for use in dry cleaning operations, products for use in textile or paper manufacturing, hard surface cleaners and the like. Among other known ingredients typically employed in such formulations are pH adjustment agents, chelating agents, exotherm control agents, solubilizers, detergent builders, fragrances, abrasives, optical brighteners, coloring agents, solvents, enzymes and so forth. Obviously, those materials selected to provide the above formulations must be compatible with the sulfone peroxycarboxylic acid of the composition.

Typically pH adjustment agents are used to alter or maintain aqueous solution of the instant compositions to a pH range of from about 2 to about 7 in which peroxyacid bleaching agents are generally most effective. Depending upon the nature of other optional composition ingredients, pH adjustment agents can be either of the acid or base type. Acidic pH adjustment agents are designed to compensate for the presence of other highly alkaline materials and include normally solid organic and inorganic acids, acid mixtures and acid salts. Examples of such acidic pH adjustment agents include citric acid, glycolic acid, sulfamic acid, sodium bisulfate, potassium bisulfate, ammonium bisulfate and mixtures such as citric acid and lauric acid.

Optional alkaline pH adjustment agents include the conventional alkaline buffering agents. Examples of such buffering agents include such salts as carbonates, bicarbonates, phosphates, silicates and mixtures thereof.

While the invention broadly contemplates compositions which do not contain chelating agents, the presence of such agents is preferred. Since the peroxyacid compounds used in the compositions of the present invention are subject to the loss of available oxygen when contacted by heavy metals, it is often desirable to include a chelating agent in the compositions. Such agents are preferably present in an amount ranging from about 0.005% to about 1.05 based on the weight of the composition. The chelating agent can be any of the well known agents, but certain are preferred. U.S. Pat. No. 3,442,937, May 6, 1969, to Sennewald et al., discloses a chelating system comprising quinoline or a salt thereof, an alkali metal polyphosphate, and, optionally, a synergistic amount of urea. U.S. Pat. No. 2,838,459, July 10, 1958, to Sprout, Jr., discloses a variety of polyphosphates as stabilizing agents for peroxide baths. Such materials are useful herein. U.S. Pat. No. 3,192,255, June 29, 1965, to Cann, discloses the use of quinaldic acid to stabilize percarboxylic acids. This material, as well as picolinic acid and dipicolinic acid, would also be useful in the compositions of the present invention. A preferred chelating system for the present invention is the alkali metal polyphosphate system.

Bleaching compositions of the present invention can be used in widely varying concentrations depending on the particular application involved but are generally utilized in an amount sufficient to provide from about 1.0 ppm to 50 ppm available oxygen in solution. Generally, this amounts to about 0.0001% to 0.005% by weight of active oxygen in solution. Fabrics to be bleached are then contacted with such aqueous bleaching solutions.

Included within the scope of this invention are various bleaching processes utilizing the compositions of the invention in which sulfone peroxycarboxylic acids are employed in effective amounts as active bleaching ingredients. Generally, in such processes, articles to be bleached are contacted in an aqueous medium with a bleach effective amount of one or more sulfone peroxycarboxylic acids. Other conditions important in such processes include temperature, pH, contact time, selection and level of various ingredients present during bleaching, agitation, etc. Optimization of such conditions can be accomplished for each particular case by routine experimentation in view of this disclosure. Particularly preferred are processes in which the temperature is fairly low, that is, not above 60° C., since such processes provide rapid and effective bleaching while minimizing adverse effects associated with higher temperatures such as dye damage, fabric shrinkage, high energy consumption, and weakening of fabrics or other articles subjected to bleaching.

The above disclosure generally describes the present invention. A more complete understanding can be obtained by reference to the following example which is provided herein for purposes of illustration only and is not intended to limit the scope of the invention.

EXAMPLE 1

Various compositions were prepared and tested for loss of active oxygen during storage and test results shown in Table I follow. Table I gives the relative amounts by weight of various components, the remainder being water to 100 grams. The percent active oxygen (%AO) was measured by iodometric titration immediately after preparation of the composition (Initial) and after the indicated number of days of storage. The compositions were stored in glass containers under ambient room temperature for the number of days indicated. Where noted, physical segregation occurred within 24 hours after preparation of the composition.

TABLE

| | COMPOSITION | | | | | | | | | | | | | | | | | |
|---|---|---|---|---|---|---|---|---|---|---|---|---|---|---|---|---|---|---|
| Component | 1 | 2 | 3 | 4 | 5 | 6 | 7 | 8 | 9 | 10 | 11 | 12 | 13 | 14 | 15 | 16 | 17 | 18 |
| LAS A-230 | 6.5 | 6.5 | 6.5 | 6.5 | 6.5 | 6.5 | 6.5 | 6.5 | 6.5 | 6.5 | 6.5 | 6.5 | 6.5 | 6.5 | — | — | 6.5 | — |
| NEODOL 25-7 | 2.8 | 2.8 | 2.8 | 2.8 | 2.8 | 2.8 | .2.8 | 2.8 | 2.8 | 2.8 | — | 2.8 | — | 2.8 | 10.0 | 6.5 | 5.6 | 3.3 |
| STEROX NK | — | — | — | — | — | — | — | — | — | — | 2.8 | — | — | — | — | — | — | — |
| CONOCO XA-C | — | — | — | — | — | — | — | — | — | — | — | — | — | — | — | 6.0 | — | — |
| $Na_2SO_4$ (Anhy.) | 6.5 | 6.5 | 6.5 | 6.5 | 6.5 | 6.5 | 6.5 | 6.5 | 6.5 | 6.5 | 6.5 | 6.5 | 6.5 | — | 6.5 | 6.5 | — | 6.5 |
| Boric Acid | — | — | — | — | — | — | — | — | — | — | — | — | — | 5.0 | — | — | 5.0 | — |
| Dequest 2010 | — | — | — | — | — | — | — | — | — | 0.5 | — | — | — | — | — | — | — | — |
| SPB | 7.5 | 7.5 | 7.5 | 7.5 | 7.5 | 3.8 | 10.0 | 15.0 | 18.8 | 7.5 | 7.5 | 7.5 | 7.5 | 7.5 | 7.5 | 7.5 | 7.5 | 7.5 |
| Hydroxypropyl Cellulose | — | — | — | — | — | — | — | — | — | — | — | 1.0 | — | — | — | — | — | — |
| Acrysol Acrysol LMW45 | — | — | — | — | — | — | — | — | — | — | — | — | — | — | — | — | 1.8 | — |
| Attagel 50 Clay | — | — | — | — | — | — | — | — | — | — | — | — | — | — | — | — | — | 2.0 |
| pH | 3.2 | 3.2 | 2.4 | 5.1 | 6.7 | 3.5 | 3.8 | 3.5 | 3.5 | 3.5 | 3.5 | 3.5 | 3.5 | 3.5 | 3.5 | 3.5 | 3.5 | 3.5 |
| Initial % AO | 0.49 | 0.43 | 0.48 | 0.55 | 0.37 | 0.22 | 0.44 | 0.90 | 1.0 | 0.44 | 0.43 | 0.42 | | -Physical segregation occured- | | | | |
| % AO after storage | 0.38 | 0.36 | 0.34 | 0.38 | 0.23 | 0.21 | 0.45 | 0.76 | 1.1 | 0.45 | 0.32 | 0.39 | | | | | | |
| (Days after initial) | (60) | (53) | (60) | (60) | (37) | (51) | (58) | (58) | (51) | (51) | (58) | (57) | | | | | | |

SPB: 4,4'sulfonebisperbenzoic acid
LAS-230: sodium linear alkyl benzene sulfonate (anionic surfactant).
Neodol 25-7: alcohol ethoxylate (non-ionic surfactant).
Sterox NK: nonylphenol polyoxyethylene ether.
Conoco XA-C: dimethylamine oxide (cationic surfactant).
Dequest 2010: (1-hydroxyethylidene-1,1-di-phosphonic acid.
Acrysol LMW45: polyacrylate (thickener).
Attagel 50 Clay: clay (thickener).

Compositions 1-5 studied the effect of pH when the relative concentration of the various components was kept constant. As shown in Table I no negative effect on available oxygen was seen at pH 2.5-5.1. However, a drop in available oxygen (0.37) was seen at pH 6.7.

Compositions 6-9 evaluated the effect of varying the concentration of bleach (SPB) from 3.8-18.8. In these compositions, the percent of available oxygen increased, albeit at a slower rate, with increasing levels of SPB.

Compositions 10-12 examined the effect of adding additional components and their relationship to %AO. Composition 10 showed that the addition of a metal sequestering agent (Dequest 2010) had no adverse effect on %AO. Likewise, composition 11 showed that different types of non-ionic surfactants such as, for example, neodol 25-7 and Sterox NK, can be used effectively in the composition without adversely affecting percent of AO. Further, the addition of a solubilizer (hydroxypropol cellulose) had no adverse effect on %AO. Formulations which were unacceptable are illustrated by compositions 13-18.

The invention now being fully described, it will be apparent to one of ordinary skill in the art that many changes and modifications can be made thereto without departing from the spirit or scope of the invention.

What is claimed is:

1. An aqueous stable liquid bleach composition comprising a) from about 1% to about 25% of a sulfone peroxycarboxylic acid having the formula

wherein A and B are peroxycarboxylic acid compatible organic moieties bonded to the sulfur atom by a carbon atom where only one of A and B at the same time, contains at least one

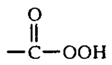

group bonded to a carbon atom, b) from about 1% to about 20% of an anionic surfactant, c) from about 1% to about 20% of a non-ionic surfactant, and d) an amount of a salt stabilizer effective to enhance the shelf-life of said composition.

2. A composition of claim 1 further including a detergent builder.

3. A composition of claim 1 further including a chelating agent.

4. A composition of claim 3, wherein said chelating agent is a phosphonate.

5. A composition of claim 4, wherein said phosphonate is 1- hydroxyethylidene-1,1- diphosphonic acid.

6. A composition of claim 1, wherein said sulfone peroxycarboxylic acid is from about 5% to about 10% by weight, said anionic surfactant is from about 5% to about 10% by weight, said non-ionic surfactant is from about 2% to about 8% by weight and in addition, a salt stabilizer is up to about 8% by weight.

7. A composition of claim 1 wherein A and B each contain from 1 to 16 carbon atoms.

8. A composition of claim 1 wherein A and B each contain from 1 to 10 carbon atoms.

9. A composition of claim 1 wherein A is linear alkyl containing one peracid group and the sulfonyl group and peracid group are on the opposite side of the terminal carbon atoms of said A moiety.

10. A composition of claim 6 wherein the compound is selected from the group consisting of
3-(n-octylsulfonyl) peroxypropionic acid,
3-(n-decylsulfonyl) peroxypropionic acid,
3-(n-hexylsulfonyl) peroxypropionic acid,
3-(n-butylsulfonyl) peroxypropionic acid,
4-(n-octylsulfonyl) peroxybutyric acid,
4-(decylsulfonyl) peroxybutyric acid,
4-(n-nonylsulfonyl) peroxybutyric acid,
3-(n-heptylsulfonyl) peroxypripionic acid, and
3-(n-nonylsulfonyl) peroxypropionic acid.

* * * * *

UNITED STATES PATENT AND TRADEMARK OFFICE

CERTIFICATE OF CORRECTION

PATENT NO. : 5,039,447

DATED : August 13, 1991

INVENTOR(S) : Bertie J. Reuben

It is certified that error appears in the above-identified patent and that said Letters Patent is hereby corrected as shown below:

In column 2, lines 6-10, please delete present formula and insert therefore

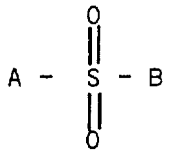

Signed and Sealed this

Fifth Day of July, 1994

Attest:

BRUCE LEHMAN

*Attesting Officer* *Commissioner of Patents and Trademarks*